United States Patent Office 3,400,103
Patented Sept. 3, 1968

3,400,103
LATENTLY CROSSLINKABLE PRESSURE-
SENSITIVE ADHESIVE POLYMERS
Carlos M. Samour, Wellesley Hills, Mass., and Donatas
Satas, Palatine, Ill., assignors to The Kendall Company,
Boston, Mass., a corporation of Massachusetts
No Drawing. Filed Jan. 14, 1965, Ser. No. 425,618
19 Claims. (Cl. 260—78)

ABSTRACT OF THE DISCLOSURE

Solutions in an organic solvent of latently crosslinkable pressure-sensitive adhesive polymers containing recurring units in the polymer having pendent active hydrogen groupings and recurring units having pendent ethylenic groupings. Monomers polymerizable to per se pressure-sensitive adhesive polymers are copolymerized with certain polyethylenic comonomers and, if not provided by the other monomers, comonomers having certain active hydrogen groupings under controlled conditions to yield a polymer soluble in an organic solvent. The adhesive polymer spread as a coating from the solution and dried at elevated temperatures converts to a crosslinked polymer as evidenced by gel content and swelling index.

---

This invention relates to the manufacture of spreadable compositions of pressure-sensitive adhesive polymers and to the manufacture of adhesive tapes therefrom. In particular, the invention relates to the production of soluble, latently crosslinkable pressure-sensitive adhesive polymers and to the subsequent conversion of the polymers, e.g., in the manufacture of adhesive tapes therefrom, to solvent-resistant, crosslinked pressure-sensitive adhesive polymers.

In the practice of this invention, a crosslinking monomer is copolymerized with certain other ethylenic monomers in the production of pressure-sensitive adhesive polymers. It is essential for the purposes of this invention that the charge of monomers includes a monomer having an active hydrogen grouping. The crosslinking monomer, more particularly defined hereinafter, is a polyethylenic compound. The polymerization of the monomers is conducted under conditions to produce at the end of the reaction a soluble pressure-sensitive adhesive polymer. It is suitably soluble for solvent spreading a smooth non-grainy adhesive coating on a backing in the manufacture of pressure-sensitive adhesive tape. The polymer is not crosslinked during the polymerization reaction. Ethylenically unsaturated groups exist in the polymer, pendent from recurring units of the polymer, for example, ethylenic groups of the crosslinking monomer which did not react with other ethylenic groups during formation of the polymer. The polymer can subsequently be converted, without the aid of catalysts, to a crosslinked polymer exhibiting tack and adhesion properties of a pressure-sensitive adhesive and improvement in cohesion and resistance to solvents. The conversion to its crosslinked state can be made readily by means of a simple heat curing step, in a matter of minutes, and at temperatures which do not deleteriously effect the polymer. The conversion conveniently can be made during oven drying of solvent spread tape.

It has heretofore been proposed to copolymerize a crosslinking monomer with certain other monomers which by themselves polymerize to form a tacky, but cohesively weak, adhesive mass. This has been proposed in British Patent 624,764. This patent contains no reference to latently crosslinkable polymers. According to this patent, no more than 1% by weight of the crosslinking monomer is copolymerized with the other monomers. None of the monomers employed in the preparation of the pressure-sensitive adhesive polymers contains an active hydrogen grouping. The polymerization reactions set forth in the examples of the British patent are conducted at temperatures of from 70° C. to 90° C. A polymer was prepared at temperatures of 70° C. to 90° C. following these teachings. Addition of the polymer thus prepared to solvent resulted in the formation of a swollen gel which could not be spread to form a tape coating.

In comparison, the polymers of this invention which also contain active hydrogen groupings are initially soluble and latently crosslinkable under heating conditions such as encountered in even drying of solvent spread adhesive tapes. The heat cured polymer has a gel content greater than the uncured polymer. The significance of the difference in solubility between the uncured polymer and the cured polymer will be readily appreciated by those skilled in the art. The polymer may be spread from a solvent solution and then, without the aid of any additional ingredient, be converted to a polymer resistant to the very solvent or solvents employed in the solution. Another advantage is that adhesive coatings may be prepared which ultimately have highly crosslinked polymers in the coating without loss of the desired properties of the crosslinked polymer due to degradation of the polymer caused by milling or shear mixing operations that would be required to prepare spreadable solutions from the crosslinked polymers.

In accordance with this invention the polymerization reaction is conducted at a temperature no greater than 35° C. to 40° C. The catalyst employed is chosen with regard to the monomers to be polymerized and this temperature limitation. Catalysts suitable for addition polymerization of the ethylenic monomers are peroxide-type, free radical initiators which may be used alone or in the presence of reducing agents. If an aqueous emulsion polymerization system is employed the polymer is separated therefrom and dissolved in solvent from which the polymer may be coated. If a solvent polymerization system is employed the polymer may be spread directly from the reaction mixture. In an event, a solvent spreadable coating composition is prepared with the polymer and coated upon a tape backing. The coated backing is then subjected to a heat treatment at elevated temperatures during which the solvent is evaporated therefrom and the polymer is cured or converted to a crosslinked polymer.

This invention may be practiced with those monomers or mixtures of monomers which by themselves can be polymerized to for tacky, adhesive polymers, and may be advantageously employed in the instance of those monomers which yield polymers which have sufficient cohesive strength for use as per se pressure-sensitive adhesives and also those which yield tacky, adhesive polymers which because of deficiencies in cohesive strength have only marginal or no utility for per se pressure-sensitive adhesive applications. Examples of monomers and mixtures of monomers which can be so polymerized include: alkyl acrylates and mixtures thereof; mixtures of alkyl acrylates and alkyl methacrylates; mixtures of alkyl acrylates and vinyl esters; mixtures of alkyl acrylates and dialkyl esters of fumaric or maleic acid; mixtures of alkyl acrylates and vinyl ethers; mixtures of alkyl acrylates and vinyl pyrrolidone; mixtures of dialkyl maleates and vinyl pyrrolidone; mixtures of alkyl acrylates and one or more polar compounds such as acrylic acid; methacrylic acid, itaconic acid, acrylamide, methacrylamide, acrylonitrile and methacrylonitrile; mixtures of N-alkyl substituted amido derivatives of dicarboxylic acids and alkyl acrylates, alkyl methacrylates and mixtures thereof; mixtures of N-alkyl acrylamides and alkyl acrylates, alkyl methacrylates and mixtures thereof; mixtures of N-alkyl methacrylamides and alkyl acrylates, alkyl methacrylates and mixtures thereof; and mixtures of alkyl half-ester derivatives of dicarboxylic acids and alkyl acrylates, alkyl methacrylates and mixtures thereof.

An active hydrogen is a hydrogen atom directly attached to an atom other than carbon, e.g., oxygen, as in an —OH grouping in an alcohol or as in a carboxylic group (—COOH) of an acid; sulfur, as in a —SH grouping in a thiol or in a carboxythioic group (—COSH) of a thio-acid; and nitrogen, as in a >NH grouping in an unsubstituted amide, as in a primary alkyl amide, in an ester derived from an amino alcohol, in an ester derived from a N-t-alkyl substituted secondary amino alcohol, in an amide derived from polyamino analogues of said alcohols, or in an unsubstituted imide. The present polymers which contain groupings providing active hydrogen crosslink under relatively mild conditions to yield improved crosslinked polymers, as indicated above. The groupings are attached to ethylenically unsaturated monomers copolymerizable with the other monomers of the polymer. Certain monomers employed in the production of per se pressure-sensitive adhesive polymers contain groupings having an active hydrogen. Examples of polymers formed from such monomers are N-alkyl amic acid: $C_1$ to $C_{14}$ alkyl acrylate pressure-sensitive adhesive polymers disclosed in copending application Ser. No. 386,476, filed July 21, 1964, now U.S.P. 3,299,010 and $C_4$ to $C_{12}$ alkyl acrylate: acrylic acid adhesive polymers in Reissue Patent 24,906.

The amount of copolymerized active hydrogen containing monomer that may be in the polymers according to this invention is dependent upon its composition and the composition of the other monomers. It may constitute a major proportion of the polymer, on a weight basis, as in the case of certain of the polymers of said application Ser. No. 386,476 where the active hydrogen containing amic acid monomers are complex mixtures of N-alkyl amic acids averaging from 8 to 24 carbon atoms in the alkyl groups thereof. In this instance the active hydrogen containing amic acid monomers may constitute as much as about 70% of the present polymers. In other instances the active hydrogen containing monomer may constitute a fraction of 1% of the total weight of the polymer, as in the case of acrylate:acrylic acid polymers. Generally, it is desirable that the number of active hydrogen containing groups be at least equal, on a molar basis, to the number of crosslinking monomers incorporated into the pressure-sensitive adhesive polymer as recurring units thereof. Examples of active hydrogen containing monomers, but which are not exhaustive of such monomers, are as follows: mono-acrylate and mono-methacrylate esters of polyhydric alcohols; diesters of polyhydric alcohols of alpha ethylenically unsaturated alpha-beta dicarboxylic acids; half-esters of said dicarboxylic acids; esters of tertiary alkyl secondary amino alcohols and ethylenically unsaturated acids; unsubstituted amides and primary alkyl amides of said acids (including mono and diamides of dicarboxylic acids); unsubstituted imides of said ethylenically unsaturated dicarboxylic acids; acrylic and methacrylic acids; and alpha ethylenically unsaturated alpha-beta dicarboxylic acids.

Crosslinking monomers, as the term is used herein, are polyethylenically unsaturated monomers containing at least two ethylenic groups, non-conjugated with respect to each other. These groups are the reactive sites in the crosslinking monomer at which they are copolymerized with the other monomers. The ethylenic group may be a terminal ethylenic group; as such it may be either of two types: a vinyl group or a vinylidene group. The ethylenic group may be a non-terminal ethylenic group, in which case it is located conjugate to a hetero double bond in the monomer. A hetero double bond is defined herein as a double bond between a carbon atom and an atom other than carbon. The crosslinking monomer may be a monomer containing only terminal ethylenic groups, a monomer containing only non-terminal ethylenic groups, or a monomer containing both terminal and non-terminal ethylenic groups. Monomers of the type described here are well known as crosslinking monomers for addition to the monomer charge in polymerization systems for the production of polymers other than those of concern here. The following are a few specific examples of crosslinking monomers: ethylene glycol dimethacrylate, allyl acrylate, mono and diallyl esters of fumaric acid, ethylene glycol difumarate and divinyl benzene. Other examples illustrative of the crosslinking monomers are given in the following examples of the invention and subsequent disclosure.

EXAMPLE 1

Recipe:

| Primary Monomers | Parts by wt. |
|---|---|
| N-t-$C_{12}$ maleamic acids | 24.6 |
| Ethyl acrylate | 7.6 |
| 2-ethyl-hexyl acrylate | 62.8 |
| Crosslinking Monomer | |
| Divinyl benzene | 5.0 |
| Catalyst | |
| Hydrogen peroxide (30%) | 0.603 |
| Ferrous ammonium sulfate | 0.1 |
| Ascorbic acid | 0.466 |
| Distilled water | 227.3 |
| Surfactant | 8.0 |

The monomers listed under the heading "Primary Monomers" polymerize, in the absence of a crosslinking monomer, to form a per se pressure-sensitive adhesive polymer. The N-t-$C_{12}$ maleamic acid primary monomers contain active hydrogen groupings, e.g., —COOH. The N-t-$C_{12}$ maleamic acid monomer is a mixture of maleamic acids prepared by the amidation of maleic anhydride with a complex mixture of alkyl amines marketed as Primene 81–R by the Rohm and Haas Company and reported to be t-alkyl primary amines having highly branched alkyl groups containing from 11–22 carbon atoms in the alkyl groups and consisting principally (90%) of $C_{11}$ to $C_{14}$ branched alkyl amines. The average number of carbon atoms in the alkyl groups of this amine mixture is about 12.

The mol ratio of the primary monomers, in the order listed, is about 1.0:0.9:4. The amic acid monomer constitutes about 25%, by weight, of the total primary monomers. The weight percent of the crosslinking divinylbenzene monomer is about 5.2% of the weight of the primary monomers.

The polymerization was conducted in the following manner. The surfactant (12.8 parts of a 25% aqueous solution of Igepal CO–970 and 4.8 parts Igepal CO–630) was added to about 113 parts of the water in a 3-necked reaction vessel equipped with stirrer, thermometer and buret. The solution was charged with the monomers and stirred to obtain an emulsion. The emulsion was cooled to below 25° C. Nitrogen was bubbled continuously into the system. The hydrogen peroxide in a water solution was added. After about 15–20 minutes of continuous stirring the pH was adjusted to approximately 2.0 by the addition of concentrated HCl directly to the emulsion and also in a solution of the ferrous ammonium sulfate and ascorbic acid in water. The rate of addition of this solution was controlled to maintain the temperature of the emulsion under 25° C. The maximum temperature of the emulsion during polymerization was 19° C. The minimum was 5° C.

The polymer emulsion was coagulated in a solution of 25% sodium chloride in water (hot tap water temperature). The coagulum was washed with cold tap water to remove surfactant. The water wet polymer (20–35% water) and toluene were mixed to form a solvent spreadable coating composition containing approximately 22% solids. A smooth, 1–2 mil thick coating of the adhesive polymer was spread upon strips of polyethyleneterephthalate film. The coated tapes were permitted to air dry at ordinary room temperatures (70°–75° F.).

The properties of the tapes as prepared (no-cure) and the properties of tapes subjected to a curing treatment of about 350° F. for 3 minutes are compared in Table I.

TABLE I

|  | No Cure | Cured (350° F., 3 min.) |
| --- | --- | --- |
| Peel Adhesion (oz.) | 50 | 43 |
| Probe Tack (gms.) | d | d |
| Creep Resistance | ½″/5 sec. | 0″/24 hr. |
| Percent, Gel | <1 | 94 |
| Swelling Index |  | 3 |

The letter "d" indicates delamination of adhesive from the backing during the test.

All tapes were one inch in width. The peel adhesion value is the force required to remove the adhesive tape at 75° F. from a stainless steel surface pressed into contact therewith by rolling a five pound roller once over the backside of the tape. The tape is stripped from the steel surface at a 180° angle. The adhesive tapes were tested for tack on a probe tack apparatus of the type marketed by TMI, Inc. under the trade name of Polyken Probe Tack Tester. The adhesive coating delaminated from the backing in this test. The adhesive coating, however, was tacky.

In this test the smooth polished end surface of a cylindrical steel probe ¼″ in diameter and the adhesive surface are brought into contact with each other for one second at a contact pressure of one pound per square inch of contact surface. The force required to separate the adhesive surface from the probe surface is recorded on a force gauge and is reported in grams. In determining creep resistance, a one inch strip of tape is applied to a vertical stainless steel surface at room temperature. A 2.2 kg. weight is suspended from the bottom free end of the tape. The distance that the tape moves downwardly for the stated period of time is reported as creep resistance.

The percent gel is a measurement of the insolubility of the polymer. The swelling index (S.I.) is a measurement of the "tightness" of the gel. These measurements are indicative of crosslinking and the extent of crosslinking. In these determinations, a tape sample is immersed in toluene in a closed container and tumbled for 1 to 3 hours after which the adhesive mass, if any, on the tape backing is scraped off the backing and placed in the solvent. The amount of adhesive in the container is determined by subtracting the weight of the scraped and dried backing from the weight of the tape sample. Tumbling is then continued for at least about 12 hours. Insoluble polymer is filtered from the toluene and weighed while still wet (swollen) with solvent and then dried and weighed. The percent gel is obtained by dividing the weight of the dried insoluble polymer by the weight of the adhesive polymer prior to immersion in the toluene. The swelling index is obtained by dividing the difference obtained by subtracting the weight of the dried insoluble polymer from the weight of the "wet" (swollen) insoluble polymer by the weight of the dried insoluble polymer. References in the disclosure and claims to gel content and swelling index shall mean the percent gel and swelling index as determined in the manner above-described.

The improvement in creep resistance and resistance to solvent in the case of the cured adhesive polymer is readily apparent from the data of Table I. The data show that the polymer crosslinked when subjected to the curing treatment in the absence of catalyst. The crosslinking reaction can be made to occur during polymerization of the monomers in the reaction vessel. Insoluble pressure-sensitive adhesive polymer in fact can be prepared in the reaction vessel by conducting the polymerization reaction described in Example 1 at temperatures above about 35°–40° C.

In accordance with this invention the gel content of the polymer, after the polymerization reaction, is such that solutions thereof are suitable for solvent spreading of smooth, non-grainy film-like coatings on tape backings. For this purpose, the pressure-sensitive adhesive polymer may have a gel content of up to about 15%, preferably less than about 5%, and a swelling index not less than about 50.

EXAMPLE 2

The polymers of this example were prepared in the absence of an active hydrogen containing monomer.

A pressure-sensitive adhesive polymer was prepared by copolymerizing in aqueous emulsion ethyl acrylate (1 mol), 2-ethylhexylacrylate (4 mols) and ethylene glycol dimethacrylate (1% based on weight of the acrylate primary monomers). The polymerization temperature ranged from 15° to 33.2° C. The procedure for making the polymer and tapes therefrom was generally as described in Example 1. No improvement in creep resistance or resistance to solvent occurred upon heating at about 250° F. for 15 minutes. Another polymer was similarly prepared using 5% of the dimethacrylate crosslinking monomer instead of 1%. The temperature of polymerization ranged from 13.5° to 39° C. No improvement in these properties was seen when tapes made therefrom were heated for 10 minutes and for 3 hours at about 257° F.

It is thus seen that the active hydrogen containing monomer is critical for the purposes of this invention. Further examples of the invention are set forth in the following tables. Except for Example 8, the polymers and tapes were prepared essentially as described in Example 1. The polymer of Example 8 was prepared by solution polymerization of the monomers. The acrylate, acrylic acid and dimethacrylate monomers were dissolved in methyl ethyl ketone and added to the reaction vessel of Example 1 with 25 parts by weight of water. The system was purged with nitrogen. The catalyst system was vanadyl acetyl acetonate and cumene hydroperoxide. The temperature of solution at the time of beginning addition of the catalyst was 19° C. The temperature dropped to 13° C. after most of the catalyst was added. The solution was heated and at the time of final addition of catalyst the temperature was 32° C., the maximum temperature reached. After about 1½ hours, the solution became viscous and stirring was stopped. The solution was diluted with methyl ethyl ketone to a solids content of about 25%. Tapes were prepared by spreading a coating of the polymer from the solution on film and air drying as described above.

TABLE II

| Monomer Amount, wt.; | Examples | | | | | | | |
|---|---|---|---|---|---|---|---|---|
| | 3 | 4 | 5 | 6 | 7 | 8 | 9 | 10 |
| EA | 8.6 | 11.0 | | | | | 7.6 | 7.6 |
| BA | | | | 40.0 | 38.0 | | | |
| 2-EAH | 63.6 | 80.8 | 72.0 | 50.0 | 47.0 | 93.0 | 62.8 | 62.8 |
| TDMAE | 25.7 | | | | | | | |
| PMA | | | | | | | 24.6 | 24.6 |
| VA | | | 20.0 | | | | | |
| Aa | | 7.0 | | | | | | |
| AA | | | 4.0 | | | 4.0 | | |
| TBAEMA | | | | 10.0 | | | | |
| HEMA | | | | 5.0 | | | | |
| EGDMA | 2.0 | 2.0 | | | | 3.0 | | |
| PEGDMA | | | 4.0 | | | | | |
| 3-EGDMA | | | | 5.0 | | | | |
| 1,3-BGDMA | | | | | 5.0 | | | |
| DVE | | | | | | | 5.0 | |
| DMA | | | | | | | | 5.0 |
| Polym'n Temp.; | | | | | | | | |
| Temp. C, max | 19.5 | 23.5 | 20.0 | 17.0 | 21.0 | 32.0 | 31.0 | 25.0 |
| Temp. Change | 14.5 | 17.5 | 17.0 | 12.0 | 17.0 | 13.0 | 27.0 | 20.0 |
| No Cure; | | | | | | | | |
| Adhes'n. (oz.) | 34 | 7 | 20 | 29 | 47 | 46 | 28 | 53 |
| Tack | 684 | 306 | 200 | 390 | 566 | 1,008 | 778 | 844 |
| Creep | ½"/4.5 hr | 0"/50 hr | ½"/1¼ | ½"/15' | ½"/20' | ½"/36 hr | ½"/7' | ½"/1.5' |
| Percent Gel | 20 | 22 | 6 | 1 | 1 | 1 | 1 | 1 |
| S.I. | 47 | 7 | | | | | | |
| Cure (350° F.) | 3' | 3' | 3' | 3' | 3' | 3' | 1' | 10' |
| Adhes'n. (oz.) | 23 | 3 | 7 | 4 | 6 | 35 | 15 | 81 |
| Tack | 630 | 315 | 120 | 352 | 414 | 724 | 256 | 820 |
| Creep [3] | ½"/48 hr | 0"/50 hr | 1/16"/50 hr | ½"/69' | (1) | 0"/140 hr | (2) | ½"/50 hr |
| Percent Gel | 76 | 75 | 83 | 84 | 93 | 93 | 88 | 20 |
| S.I. | 18 | 8 | 9 | 6 | 6 | 6 | 3 | 66 |

[1] Adhesion failure after 4 hours.
[2] Failed at 2 hours.
[3] 1,000 gm. weight in this test of Example 8 tape.

EA is ethyl acrylate; BA is n-butyl acrylate; 2-EHA is 2-ethyl hexyl acrylate; TDMAE is the half-ester of maleic acid and tridecyl oxo alcohol (a mixture of tetramethylnonol isomers); PMA is the N-t-$C_{12}$ maleamic acid previously described; VA is vinyl acetate; Aa is acrylamide; AA is acrylic acid; HEMA is hydroxyethyl methacrylate; TBAEMA is t-butylaminoethyl methacrylate; EGDMA is ethylene glycol dimethacrylate; PEGDMA is polyethylene glycol dimethacrylate having a molecular weight of 336 prepared from a mixture of polyethylene glycols averaging to a molecular weight of 200; 3-EGDMA is triethylene glycol dimethacrylate; 1,3-BGDMA is 1,3-butylene glycol dimethacrylate; DVE is divinyl ether; and DMA is the dimaleate of 2,3-dimethyl pentane diol-2,4.

The polymers in Examples 3, 4, and 5 partially cross-linked upon air drying, as indicated by the gel contents and swelling indices for these polymers. The polymers were initially soluble after the polymerization reaction.

Reduction in tack and adhesion by crosslinking is of course, to be expected. Adhesion and tack are least affected in the case of N-t-$C_{12}$ amic acid:acrylate pressure-sensitive adhesive polymers. Generally, the adhesion and tack of adhesive polymers prepared from primary monomers of mixed highly branched alkyl derivatives such as described in said application Serial No. 386,476 are least affected by the crosslinking reaction. Polymers with such primary monomers when produced in accordance with this invention exhibit initially low gels, are soluble and can be cured to have a high gel content. The preferred crosslinking monomers for adhesive polymer systems of this type are the terminally unsaturated crosslinking monomers, such as the diacrylates and dimethacrylates of mono- and poly-glycols.

The principal variables in the crosslinking process for a given composition of the monomers are the temperature, time of the curing treatment and the molecular weight of the polymer before cure. This is illustrated in Table III. The polymers of Table III were prepared from the monomers of N-t-$C_{12}$ maleamic acids, ethyl acrylate and 2-ethyl acrylate in a mol ratio of 1:1:4. These monomers were polymerized with various amounts of EGDMA and tetraethylene glycol dimethacrylate (TEGDMA). Improvement in creep resistance and resistance to solvents in polymer systems containing 1-4% of such crosslinking monomers can be accomplished in ½ to 5 minutes upon curing at temperatures in the range of about 90° C. to 175° C. Polymers containing 7% TEGDMA have been cured satisfactorily within 2 to 4 minutes in the case of tapes made on production solvent spreading equipment in which the temperature gradient in the oven is from about 150° F. (65° C.) to about 300° F. (150° C.).

TABLE III

| Cure (° F./min.) | Adhesion (oz.) | Tack (gms.) | Gel Data | |
|---|---|---|---|---|
| | | | Percent | S.I. |
| 7% TEGDMA: | | | | |
| 350-0 | 41 | 1,045 | 7 | 10 |
| 350-½ | 39 | 938 | 75 | 17 |
| 350-1 | 43 | 887 | 76 | 18 |
| 350-2 | 15 | 894 | 81 | 13 |
| 350-4 | 1 | 825 | 90 | 10 |
| 350-8 | | 767 | 90 | 8 |
| 300-1 | 41 | 1,063 | 35 | 12 |
| 300-2 | 42 | 1,073 | 56 | 15 |
| 250-3 | 38 | 1,066 | 58 | 17 |
| 250-4 | 47 | 1,158 | 57 | 17 |
| 4% TEGDMA: | | | | |
| 350-0 | 44 | 973 | 5 | 55 |
| 350-½ | 45 | 960 | 61 | 30 |
| 350-1 | 36 | 935 | 63 | 10 |
| 350-2 | 37 | 734 | 66 | 6 |
| 300-2 | 40 | 1,012 | 51 | 28 |
| 300-4 | 34 | 1,056 | 57 | 20 |
| 250-6 | 34 | 1,042 | 50 | 37 |
| 250-8 | 34 | 955 | 60 | 35 |
| 2% TEGDMA: | | | | |
| 350-0 | 39 | 936 | 6 | |
| 350-1 | 35 | 843 | 58 | 48 |
| 350-2 | 32 | 787 | 62 | 42 |
| 300-4 | 44 | 924 | 44 | 36 |
| 300-6 | 36 | 908 | 48 | 39 |
| 250-4 | 41 | 914 | 7 | |
| 250-6 | 36 | 869 | 12 | 33 |
| 250-8 | 32 | 880 | 29 | 38 |
| 1% TEGDMA: | | | | |
| 350-0 | 35 | 884 | 1 | |
| 350-1 | 36 | | 1 | |
| 350-2 | | 816 | 10 | 50 |
| 350-4 | 34 | 852 | 24 | 42 |
| 300-8 | 32 | 926 | 11 | 43 |
| 300-10 | 38 | 854 | 29 | 37 |
| 250-10 | 36 | 863 | 1 | |
| 250-14 | 36 | 839 | 3 | |
| 4.2% EGDMA: | | | | |
| 350-0 | 54 | 1,230 | 3.5 | |
| 350-½ | 56 | 1,048 | 64 | 19 |
| 350-1 | 49.5 | 1,202 | 76 | 21 |
| 300-2 | 53 | 1,013 | 60 | 23 |
| 300-3 | 53.5 | 1,160 | 67 | 20 |
| 2.4% EGDMA: | | | | |
| 350-0 | 51 | 1,095 | 1.6 | |
| 350-½ | 47 | 1,100 | 57 | 40 |
| 350-2 | 45 | 1,136 | 63 | 25 |
| 300-4 | 42.5 | 1,172 | 58 | 32 |
| 300-5 | 57 | 1,148 | 60 | 33 |

TABLE III—Continued

| Cure (° F./min.) | Adhesion (oz.) | Tack (gms.) | Gel Data Percent | Gel Data S.I. |
|---|---|---|---|---|
| 1.2% EGDMA: | | | | |
| 350-0 | 46 | 1,014 | 0 | |
| 350-2 | 38.5 | 1,058 | 59 | 52 |
| 350-3 | 38 | 982 | 62 | 43 |
| 300-6 | 37 | 967 | 49 | 59 |
| 300-8 | 43 | 1,012 | 58 | 49 |
| 0.6% EGDMA: | | | | |
| 350-0 | 47 | 945 | 0 | |
| 350-6 | 34 | 826 | 48 | 56 |
| 350-8 | 32 | 772 | 60 | 40 |
| 300-10 | 34 | 973 | 9 | 69 |
| 300-12 | 32 | 924 | 8 | 55 |

Latently crosslinkable pressure-sensitive adhesive polymers can be prepared with crosslinking monomers containing more than two ethylenic groupings under the conditions described above. Trimethylol propane trimethacrylate when substituted for the TEGDMA monomer in the Table III polymers yielded uncured polymers having the following properties: tack—850–1000 grams; adhesion—30–35 oz.; and gel content of less than 1%. The properties of cured adhesives containing ½% to 4% of this trimethacrylate were in the following ranges: tack, 800–950 grams; adhesion, 30–40 oz.; gel content, 40–75%, and solvent indices of 50–12.

The uncured polymers may be blended with pressure-sensitive adhesive polymers which do not contain a crosslinking monomer. Longer curing times are required for improved performance of the blends than for the latently crosslinkable polymer itself.

The addition of other ingredients to the present polymers may be desirable in some instances. The other materials may be blended with the polymers for the purpose of modifying or improving the properties of the crosslinked pressure-sensitive adhesive polymer, or for other purposes. These materials may be rubber tackifying resins, plasticizers, pigments and dyes compatible with the polymer. It has been observed, for example, that crosslinking may be accompanied with a reduction in adhesion, as in the case of the polymer of Example 4. The addition of 20% (by weight of this polymer) of a non-heat reactive phenol formaldehyde resin (Durez 19900 manufactured by The Hooker Electro Chemical Company) results in an increase in adhesion as well as tack. The adhesion and tack of an air dried tape coating of this blend were 33 oz. and 558 grams, respectively. The corresponding values for the cured coating (350° F. for 3 minutes) were 21 oz. and 524 grams. The creep resistances of the tapes were as reported in Table II for the polymer itself. The gel content of the adhesive coating was 4% prior to cure and was 60% after curing for 350° for 3 minutes. The swelling index of the gel from the cured tape was 10. In other cases the addition of resins or plasticizers may be blended with the polymer to compensate for changes in adhesive properties as may result for example by the addition of pigments or other materials added to the polymer for coloring purposes.

The solvent or mixture of solvents employed in the preparation of the coating compositions of the invention depends upon the composition of the polymers and, if any, other materials that may be added to blend with the polymers. Examples of solvents in addition to toluene are various ketones, such as methyl ethyl ketone, and high boiling point fractions of petroleum hydcarbons known to the industry.

Reference has been made to certain pressure-sensitive adhesive polymer compositions of particular suitability for the crosslinking system of this invention. These include polymers, as described in application Ser. No. 386,476, consisting essentially of certain alkyl acrylate or methacrylate monomers copolymerized with certain amido or halfester monomers. The amido monomers are derivatives of alpha unsaturated alpha-beta dicarboxylic acids and alpha unsaturated monocarboxylic acids and mixtures of alkyl amines having from 1 to about 28 carbon atoms in the alkyl groups. The dicarboxylic acid may be maleic, fumaric, citraconic or itaconic acid, for example. The amido derivative of these acids may be an amic acid, a diamide, ester-amide or imide. The amines from which these amido derivatives may be obtained (other than the imide) include secondary amines in which the secondary alkyl groups contain no more than 10 carbon atoms and are branched if they contain more than 6 carbon atoms. Other amido monomers are amides of acrylic and methacrylic acids of these amines.

Polymers may be prepared by copolymerizing (A) from about 1 to 70 parts by weight of amido monomers which are derived from the dicarboxylic acids and (B), correspondingly, from 99 to 30 parts by weight of the acrylate or methacrylate monomers to total 100 parts (A) and (B). If the (A) monomer is one amido monomer, it may be an amido derivative of an amine selected from the group consisting of $C_1$ to $C_6$ straight chain and $C_3$ to $C_{10}$ branched chain alkyl amines. If the (A) monomer is to be an amido derivative of a mixture of alkyl amines, the mixture must average no more than about 24 carbon atoms in the alkyl groups thereof and the alkyl amines in the mixture which contain more than 6 carbon atoms must consist essentially of branched alkyl amines in which the extent of branching increases as the size (number of carbon atoms) of the alkyl groups increases. Mixtures containing alkyl amines have more than 10 carbon atoms in the alkyl groups thereof should contain a larger number of different alkyl amines than mixtures of alkyl amines containing less than 10 carbon atoms in the alkyl groups thereof. The number of different alkyl amines in the mixture should be increased as the size of the alkyl groups increases above 10. Secondary alkyl amines in which each of the alkyl groups contain more than 10 carbon atoms should be avoided in the mixtures of amines.

The (B) monomer may be one or more ester monomers, which, if only one ester monomer, is selected from the group consisting of $C_1$ to $C_{14}$ non-tertiary alkyl acrylates and $C_4$ to $C_{14}$ non-tertiary alkyl methacrylates and if a plurality of ester monomers, are esters of at least one of the acids selected from the group consisting of acrylic acid and methacrylic acid and a mixture of alkyl alcohols containing up to 14 carbon atoms in the alkyl groups thereof, the number of carbon atoms of the alkyl methacrylates averaging at least 4.

At least 50% of the alcohols in the mixture are non-tertiary alkyl alcohols. The proportion of the (A) and (B) monomers within the weight ranges stated is chosen so as not to exceed a mol ratio of 1:1.

The polymers prepared from alkyl acrylamide monomers and alkyl methacrylamide monomers average at least 6 carbon atoms in the alkyl groups thereof and in the case of a single monomer may be a $C_6$ to $C_{10}$ straight chain or branched alkyl amide. The amides containing more than 10 carbon atoms should be mixtures as may be derived from mixtures of amines as described above in (A), but averaging at least 6 carbon atoms in the alkyl groups thereof. The acrylate and methacrylate monomers copolymerized with these amides are as described above in (B), but averaging preferably 6 carbon atoms in the alkyl groups of the alkyl methacrylates. These amides and esters may be copolymerized in the proportions of 1 to 75 parts amide monomer and, correspondingly 99 to 25 parts ester monomer. The mol ratio of amide to ester should not exceed 1:1.

The half-ester monomers are half-esters of an alpha unsaturated alpha-beta dicarboxylic acid and a mixture of alcohols selected from the group consisting of $C_1$ to $C_{24}$ alkyl alcohols. The average number of carbon atoms of the alkyl groups of the alcohols of the mixture is from about 8 to 18. The alcohols selected which contain more than 7 carbon atoms in the alkyl groups thereof consist essentially of branched alkyl alcohols. At least 50% of the alcohols selected are non-tertiary alkyl alcohols. The acrylate or methacrylate ester copolymerized with the half-ester monomer are as defined in (B) above. The proportions may range from 1 to 70 parts of the half-ester to 99 to 30 parts of the acrylate or methacrylate, but not exceeding a mol ratio of 1:1. Polymers of $C_1$ to $C_7$ half-esters and the acrylate or methacrylates are generally lacking in one or more of the porperties of adhesion, tack and cohesion for use as per se pressure-sensitive adhesives.

The range of proportions within which the amido, half-ester and acrylate or methacrylate monomers may be copolymerized to form per se pressure-sensitive adhesive polymers according to the teachings in said application Ser. No. 386,476 are outlined below:

| Primary Monomer (A) | Primary Monomer (B) | Proportion, by wt. |
|---|---|---|
| Amido (dicarboxylic acid) | Acrylate | 1:19-7:3 |
| Do | Methacrylate | 1:19-3:2 |
| Acrylamide | Acrylate | 1:19-3:1 |
| Do | Methacrylate | 1:9-3:2 |
| Methacrylamide | Acrylate | 1:19-3:1 |
| Do | Methacrylate | 1:9-1:1 |
| Half-ester | Acrylate | 1:19-7:3 |
| Do | Methacrylate | 1:19-3:2 |

The mol ratio of the primary monomer (A) to primary monomer (B) in all cases for pressure sensitive adhesive polymers does not exceed 1:1.

Further specific examples of monomers or mixtures of monomers capable of being polymerized to tacky, adhesive polymers or tacky, cohesive, adhesive polymers are set forth in the following:

Polymers derived from a $C_4$ to $C_{14}$ alkyl acrylate or a mixture of $C_1$ to $C_{14}$ alkyl acrylates averaging from 4 to 14 (preferably from 4 to 12) carbon atoms in the alkyl groups thereof.

Polymers derived from mixtures of $C_1$ to $C_{14}$ alkyl acrylates and $C_1$ to $C_{14}$ alkyl methacrylates, preferably mixtures in which the acrylates are present in a major proportion and the alkyl groups of the acrylates average at least 4 carbon atoms and the methacrylates also at least about 4.

Polymers derived from mixtures of at least about 40 parts but less than 100 parts of a $C_4$ to $C_{14}$ alkyl acrylate or a mixture of $C_1$ to $C_{14}$ alkyl acrylates averaging at least 4 carbon atoms in the alkyl groups and, correspondingly, to total 100 parts, an amount of an ester of vinyl alcohol and at least one acid having the formula R—COOH in which R is an alkyl group containing from 1 to 5 carbon atoms. Acrylate:vinyl acetate polymers are preferred of this class.

Polymers produced by copolymerizing alkyl acrylate averaging from $C_4$ to $C_{14}$ alkyl acrylates with dialkyl esters of fumaric acid, for example, polymers of 75–95 parts of $C_4$ to $C_6$ alkyl acrylates and correspondingly 25–5 parts of di-alkyl fumarates containing from 4 to 6 carbon atoms in the alkyl groups thereof.

Polymers prepared by copolymerizing from about 65 to less than 100 parts of alkyl acrylates averaging from $C_4$ to $C_{14}$ alkyl acrylates with correspondingly an amount to total 100 parts of a vinyl ether having the formula $CH_2=CH-O-R$ wherein R is an alkyl group having from one to 8 carbon atoms.

Polymers prepared by copolymerizing from about 70 to less than 100 parts of alkyl acrylates averaging from $C_4$ to $C_{14}$ alkyl acrylates with correspondingly an amount to total 100 parts of vinylpyrrolidone.

Polymers prepared by copolymerizing at least one dialkyl maleate ester of the group consisting of di-$C_4$ to $C_{14}$ maleates with vinylpyrrolidone in an amount of from 1 to 5 mols per mol of the dialkyl maleate.

Polymers produced by copolymerizing alkyl acrylates averaging from $C_4$ to $C_{14}$ alkyl acrylates with minor amounts of one or more copolymerizable polar compounds as stated earlier, particularly those compounds which contain carbonyl groups to which the polar groups are attached. Examples of such polymers are $C_4$ to $C_{14}$ alkyl arcrylate:acrylic acid containing up to about 85% or 90% of acrylates.

Further examples of crosslinking monomers are monoesters of terminally unsaturated alcohols, such as allyl and vinyl alcohols, and ethylenically unsaturated acids such as acrylic, methacrylic, butenoic, pentenoic, fumaric, maleic, citraconic and itaconic acids; diesters of terminally unsaturated alcohols and ethylenically unsaturated and saturated dicarboxylic acids, such as the diallyl maleate, fumarate, succinate, adipate and phthalate esters; diacid esters of alcohols and unsaturated dicarboxylic acids, such as ethylene difurmarate, ethylene diacrylate and dimethacrylates, butyne dimethacrylate, cyclohexane dimethanol dimethacrylate, and pentaerythritol tetramethacrylate; alkylene bis-acrylamides, methacrylamides, and diamic acids such as N,N′ethylene diacrylamide or methacrylamide and N,N′ethylene dimaleamic acid; and unsaturated ethers such as diallyl glycerol, diallyl sorbitol and diethylene glycol divinyl ether.

Monomers having a grouping containing an active hydrogen may be illustrated by members of the following classes of compounds:

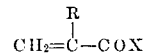

wherein R may be hydrogen or methyl and X is —OH, —$NH_2$ or —$NHR_1$ in which $R_1$ may be an alkyl group, e.g., containing from 1 to 24 carbon atoms.

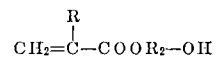

wherein $R_2$ may be an alkylene group containing from 1 to 12 carbon atoms and R is as has been defined above.

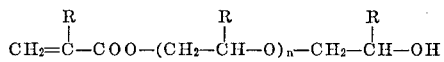

wherein R is as defined and $n$ averages from one to 9.

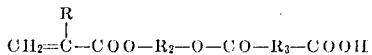

wherein $R_3$ is ethylene, propylene, o-phenylene or 1,2 cyclohexylene and R and $R_2$ are as defined above.

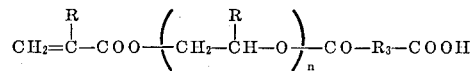

wherein $n$ is 2 to 10 and R and $R_3$ are as defined above.

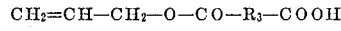

wherein $R_3$ is as defined above.

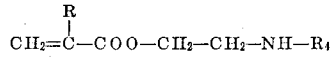

wherein R is as has been defined and $R_4$ may be a t-alkyl group having from 4 to 24 carbon atoms.

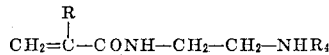

wherein R and $R_4$ are as defined above.

The reference to parts of monomers in the claims are parts by weight.

What is claimed is:

1. A composition for solvent spreading a coating of pressure-sensitive adhesive on a backing surface, comprising:
   (I) a latently crosslinkable pressure-sensitive adhesive polymer prepared by the copolymerization of monomers consisting essentially of:
   (A) about 1 to 70 parts of at least one amic acid monomer of an alpha ethylenically unsaturated, alpha-beta dicarboxylic acid and alkyl primary amine, which amic acid monomer, if an amic acid of only one amine, is an amic acid of an amine selected from the group consisting of $C_1$ to $C_6$ straight chain and $C_3$ to $C_{10}$ branched chain alkyl primary amines, and which amic acid monomer, if an amic acid of a plurality of amines, is an amic acid of a mixture of amines selected from the group consisting of $C_1$ to $C_{28}$ alkyl primary amines, said amines in the mixture averaging no more than about 24 carbon atoms in the alkyl groups thereof, the amines selected which contain more than about 6 carbon atoms in the alkyl groups thereof consisting essentially of branched alkyl amines in which the extent of branching increases as the size of the alkyl groups of the amines selected increases and in which mixture the number of different alkyl amines increases as the size of the alkyl groups which contain more than 10 carbon atoms increases;

(B) correspondingly, about 99 to 30 parts, to total 100 parts with monomer (A), of at least one ester monomer which, if only one ester monomer, is selected from the group consisting of $C_1$ to $C_{14}$ non-tertiary alkyl acrylates and $C_4$ to $C_{14}$ non-tertiary alkyl methacrylates and which, if a plurality of ester monomers, are esters of at least one of the acids selected from the group consisting of acrylic acid and methacrylic acid and a mixture of alkyl alcohols containing up to 14 carbon atoms in the alkyl groups thereof, at least 50% of which are non-tertiary alkyl alcohols, the number of carbon atoms of the alkyl groups of the alkyl methacrylates averaging at least 4; the proportion of parts of monomer (A) to monomer (B) not exceeding a mol ratio of 1:1; and (C) a crosslinking monomer in an amount up to about 15% by weight of monomers (A) and (B), said crosslinking monomer containing at least two ethylenic groups non-conjugated with respect to each other, said crosslinking monomer selected from the group consisting of (a) monomers in which said two ethylenic groups are terminal, (b) monomers in which each of said two ethylenic groups are non-terminal and conjugate with hetero double bonds in the monomer and (c) monomers in which one of said ethylenic groups is non-terminal and conjugate with a hetero double bond in the monomer and one of said ethylenic groups is terminal; and (II) an organic solvent in which said polymer is dissolved to provide a solution from which said polymer may be coated on a tape backing;
said polymer, during heating to evaporate solvent therefrom, being converted to a crosslinked polymer having a gel content greater than and a swelling index less than the polymer prior to solvent evaporation.

2. A composition for solvent spreading a coating of pressure-sensitive adhesive on a backing surface, comprising:

(I) a latently crosslinkable pressure-sensitive adhesive polymer prepared by the copolymerization of monomers consisting essentially of:

(A) about 1 to 75 parts of at least one amide monomer which, if only one amide monomer, is selected from the class consisting of $C_6$ to $C_{10}$ alkyl acrylamide and $C^3$ to $C_{10}$ alkyl methacrylamides and which, if a plurality of amide monomers are amides of at least one of the acids selected from the group consisting of acrylic acid and methacrylic acid and a mixture of amines selected from the group consisting of $C_1$ to $C_{28}$ alkyl primary amines, said amines in the mixture averaging no more than about 24 carbon atoms in the alkyl groups thereof, the amines selected which contain more than about 6 carbon atoms in the alkyl groups thereof consisting essentially of branched alkyl amines in which the extent of branching increases as the size of the alkyl groups of the amines selected increases and in which mixture the number of different alkyl amines increases as the size of the alkyl groups which contain more than 10 carbon atoms increases;

(B) correspondingly, about 99 to 25 parts, to total 100 parts with monomer (A), of at least one ester monomer which, if only one ester monomer, is selected from the group consisting of $C_1$ to $C_{14}$ non-tertiary alkyl acrylates and $C_6$ to $C_{14}$ non-tertiary alkyl methacrylates and which, if a plurality of ester monomers, are esters of at least one of the acids selected from the group consisting of acrylic acid and methacrylic acid and a mixture of alkyl alcohols containing up to 14 carbon atoms in the alkyl groups thereof, at least 50% of which are non-tertiary alkyl alcohols, the number of carbon atoms of the alkyl groups of the alkyl methacrylates averaging at least 6; the proportion of parts of monomer (A) to monomer (B) not exceeding a mol ratio of 1:1; and (C) a crosslinking monomer in an amount up to about 15% by weight of monomers (A) and (B), said crosslinking monomer containing at last two ethylenic groups non-conjugated with respect to each other, said crosslinking monomer selected from the group consisting of (a) monomers in which said two ethylenic groups are terminal, (b) monomers in which each of said two ethylenic groups are non-terminal and conjugate with hetero double bonds in the monomer and (c) monomers in which one of said ethylenic groups is non-terminal and conjugate with a hetero double bond in the monomer and one of said ethylenic groups is terminal; and (II) an organic solvent in which said polymer is dissolved to provide a solution from which said polymer may be coated on a tape backing;
said polymer, during heating to evaporate solvent therefrom being converted to a crosslinked polymer having a gel content greater than a swelling index less than the polymer prior to solvent evaporation.

3. A composition for solvent spreading a coating of pressure-sensitive adhesive on a backing surface, comprising:

(I) a latently crosslinkable pressure-sensitive adhesive polymer prepared by the copolymerization of monomers consisting essentially of.

(A) about 1 to 70 parts of at least one half-ester monomer of an alpha ethylenically unsaturated alpha-beta dicarboxylic acid and alkyl alcohol, which half-ester monomer, if a half-ester of only one alcohol, is a half-ester of alkyl alcohol selected from the group consisting of non-tertiary alkyl alcohols containing up to about 7 carbon atoms in the alkyl groups thereof, and which half-ester monomer, if a half-ester of a plurality of alcohols, is a monomeric half-ester of a mixture of alcohols selected from the group consisting of $C_1$ to $C_{24}$ alkyl alcohols, at least 50% of the alcohols selected consisting of non-tertiary alkyl alcohols, the average number of carbon atoms in the alkyl groups of the selected alcohols of said mixture being no greater than about 18, the alcohols selected which contain more than 7 carbon atoms in the alkyl groups consisting essentially of branched alkyl alcohols:

(B) correspondingly, about 99 to 30 parts, to total 100 parts with monomer (A), of at least one ester monomer which, if only one ester monomer, is selected from the group consisting of $C_1$ to $C_{14}$ non-tertiary alkyl acrylates and $C_4$ to $C_{14}$ non-tertiary alkyl methacrylates and which, if a plurality of ester monomers, are esters of at least one of the acids selected from the group consisting of acrylic acid and methacrylic acid mixture of alkyl alcohols containing up to 14 carbon atoms in the alkyl groups thereof, at least 50% of which are non-tertiary alkyl alcohols, the number of carbon atoms of the alkyl groups of the alkyl methacrylates averaging at least 4; the proportion of parts of monomer (A) to monomer (B) not exceeding a mol ratio of 1:1; and (C) a crosslinking monomer in an amount up to about 50% by weight of monomers (A) and (B), said crosslinking monomer containing at least two ethylenic groups non-conjugated with respect to each other, said crosslinking monomer selected from the group consisting of (a) monomers in which said two ethylenic groups are terminal, (b) monomers in which each of said two ethylenic groups are non-terminal and conjugate with hetero double bonds in the monomer and (c) monomers in which one of said ethylenic groups is non-terminal and conjugate with a hetero double bond in the monomer and one of said ethylenic groups is terminal; and (II) an organic solvent in which said polymer is dissolved to provide a solution from which said polymer may be coated on a tape backing; said polymer, during heating to evaporate solvent therefrom, being converted to a crosslinked polymer having a gel content greater than a swelling index less than the polymer prior to solvent evaporation.

4. A composition for solvent spreading a coating of pressure-sensitive adhesive on a backing surface, comprising:

(I) a latently crosslinkable pressure-sensitive adhesive polymer prepared by the copolymerization of monomers consisting essentially of:

(A) at least about 85 but less than 100 parts of at least one acrylate ester monomer which, if only one ester monomer, is selected from the group consisting of $C_4$ to $C_{14}$ non-tertiary alkyl acrylates and which, if a plurality of ester monomers, are esters of acrylic acid and a mixture of non-tertiary alkyl alcohols containing up to 14 carbon atoms in the alkyl groups thereof, the number of carbon atoms of the alkyl groups of said alcohols averaging at least about 4;

(B) an ethylenic monomer in an amount to total 100 parts with monomer (A), said ethylenic monomer having at least one active hydrogen grouping selected from the class consisting of —OH, —SH and >NH groupings; and (C) a crosslinking monomer in an amount up to about 15% by weight of monomers (A) and (B), said crosslinking monomer containing at least two ethylenic groups non-conjugated with respect to each other, said crosslinking monomer selected from the group consisting of (a) monomers in which said two ethylenic groups are terminal, (b) monomers in which each of said two ethylenic groups are non-terminal and conjugate with hetero double bonds in the monomer and (c) monomers in which one of said ethylenic groups is non-terminal and conjugate with a hetero double bond in the monomer and one of said ethylenic groups is terminal; and (II) an organic solvent in which said polymer is dissolved to provide a solution from which said polymer may be coated on a tape backing; said polymer, during heating to evaporate solvent therefrom, being converted to a crosslinked polymer having a gel content greater than and a swelling index less than the polymer prior to solvent evaporation.

5. A composition for solvent spreading a coating of pressure-sensitive adhesive on a backing surface, comprising:

(I) a latently crosslinkable pressure-sensitive adhesive polymer prepared by the copolymerization of monomers consisting essentially of:

(A) at least about 40 but less than 100 parts of at least one acrylate ester monomer which, if only one ester monomer, is selected from the group consisting of $C_4$ to $C_{14}$ non-tertiary alkyl acrylates and which, if a plurality of ester monomers, are esters of acrylic acid and a mixture of non-tertiary alkyl alcohols containing up to 14 carbon atoms in the alkyl groups thereof, the number of carbon atoms of the alkyl groups of said alcohols averaging at least about 4;

(B) an amount to total 100 parts with monomer (A), of an ester monomer of vinyl alcohol and at least one acid having the formula R—COOH in which R is an alkyl group containing from 1 to 5 carbon atoms;

(C) about 1 to 15% by weight of monomers (A) and (B) of at least one ethylenic monomer having at least one active hydrogen grouping selected from the class consisting of —OH, —SH and >NH groupings; and (D) a crosslinking monomer in an amount up to about 15% by weight of monomers (A) and (B), said crosslinking monomer containing at least two ethylenic groups non-conjugated with respect to each other, said crosslinking monomer selected from the group consisting of (a) monomers in which said two ethylenic groups are terminal, (b) monomers in which each of said two ethylenic groups are non-terminal and conjugate with hetero double bonds in the monomer and (c) monomers in which one of said ethylenic groups is non-terminal and conjugate with a hetero double bond in the monomer and one of said ethylenic groups is terminal; and (II) an organic solvent in which said polymer is dissolved to provide a solution from which said polymer may be coated on a tape backing; said polymer, during heating to evaporate solvent therefrom, being converted to a crosslinked polymer having a gel content greater than and a swelling index less than the polymer prior to solvent evaporation.

6. A composition for solvent spreading a coating of pressure-sensitive adhesive on a backing surface, comprising:

(I) a latently crosslinkable pressure-sensitive adhesive polymer prepared by the copolymerization of monomers consisting essentially of:

(A) at least about 60 but less than 100 parts of at least one acrylate ester monomer which, if only one ester monomer, is selected from the group consisting of $C_4$ to $C_{14}$ non-tertiary alkyl acrylates and which, if a plurality of ester monomers, are esters of acrylic acid and a mixture of non-tertiary alkyl alcohols containing up to 14 carbon atoms in the alkyl groups thereof, the number of carbon atoms of the alkyl groups of said alcohols averaging at least about 4;

(B) an amount, to total 100 parts with monomer (A), of a vinyl ether having the formula $CH_2=CH—O—R$ wherein R is an alkyl group having from 1 to 8 carbon atoms;

(C) an ethylenic monomer in an amount up to about 15% by weight of the total of monomers (A) and (B), having at least one active hydrogen grouping selected from the class consisting of —OH, —SH and >NH groupings; and (D) a crosslinking monomer in an amount up to about 15% by weight of the total of monomers (A) and (B), said crosslinking monomer containing at least two ethylenic groups non-conjugated with respect to each other, said crosslinking monomer selected from the group consisting of (a) monomers in which said two ethylenic groups are terminal, (b) monomers in which each of said two ethylenic groups are non-terminal and conjugate with hetero double bonds in the monomer and (c) monomers in which one of said ethylenic groups is non-terminal and conjugate with a hetero double bond in the monomer and one of said ethylenic groups is terminal; and (II) an organic solvent in which said polymer is dissolved to provide a solution from which said polymer may be coated on a tape backing;

said polymer, during heating to evaporate solvent therefrom, being converted to a crosslinked polymer having a gel content greater than and a swelling index less than the polymer prior to solvent evaporation.

7. A composition for solvent spreading a coating of pressure-sensitive adhesive on a backing surface, comprising:

(I) a latently crosslinkable pressure-sensitive adhesive polymer prepared by the copolymerization of monomers consisting essentially of:

(A) at least about 70 but less than 100 parts of at least one acrylate ester monomer which, if only one ester monomer, is selected from the group consisting of $C_4$ to $C_{14}$ non-tertiary alkyl acrylates and which, if a plurality of ester monomers, are esters of acrylic acid and a mixture of non-tertiary alkyl alcohols containing up to 14 carbon atoms in the alkyl groups thereof, the number of carbon atoms of the alkyl groups of said alcohols averaging at least about 4;

(B) vinylpyrrolidone in an amount to total 100 parts with monomer (A);

(C) an ethylenic monomer in an amount up to about 15% by weight of the total of monomers (A) and (B), said ethylenic monomer having at least one active hydrogen grouping selected from the class consisting of —OH, —SH and >NH groupings; and (D) a crosslinking monomer in an amount up to about 15% by weight of the total of monomers (A) and (B), said crosslinking monomer containing at least two ethylenic groups non-conjugated with respect to each other, said crosslinking monomer selected from the group consisting of (a) monomers in which said two ethylenic groups are terminal, (b) monomers in which each of said two ethylenic groups are non-terminal and conjugate with hetero double bonds in the monomer and (c) monomers in which one of said ethylenic groups is non-terminal and conjugate with a hetero double bond in the monomer and one of said ethylenic groups is terminal; and (II) an organic solvent in which said polymer is dissolved to provide a solution from which said polymer may be coated on a tape backing;

said polymer, during heating to evaporate solvent therefrom, being converted to a crosslinked polymer having a gel content greater than and a swelling index less than the polymer prior to solvent evaporation.

8. A composition for solvent spreading a coating of pressure-sensitive adhesive on a backing surface, comprising:

(I) a latently crosslinkable pressure-sensitive adhesive polymer prepared by the copolymerization of monomers consisting essentially of:

(A) at least one dialkyl maleate monomer selected from the group consisting of $C_4$ to $C_{14}$ dialkyl maleates;

(B) vinylpyrrolidone in an amount of from 1 to 5 mols thereof per mol of the dialkyl maleate monomer (A);

(C) an ethylenic monomer in an amount up to about 15% by weight of the total of monomers (A) and (B), said ethylenic monomer having at least one active hydrogen grouping selected from the class consisting of —OH, —SH and >NH groupings; and (D) a crosslinking monomer in an amount up to about 15% by weight of the total of monomers (A) and (B), said crosslinking monomer containing at least two ethylenic groups non-conjugated with respect to each other, said crosslinking monomer selected from the group consisting of (a) monomers in which said two ethylenic groups are terminal, (b) monomers in which each of said two ethylenic groups are non-terminal and conjugate with hetero double bonds in the monomer and (c) monomers in which one of said ethylenic groups is non-terminal and conjugate with a hetero double bond in the monomer and one of said ethylenic groups is terminal; and (II) an organic solvent in which said polymer is dissolved to provide a solution from which said polymer may be coated on a tape backing;

said polymer, during heating to evaporate solvent therefrom, being converted to a crosslinked polymer having a gel content greater than and a swelling index less than the polymer prior to solvent evaporation.

9. A composition for solvent spreading a coating of pressure-sensitive adhesive on a backing surface, comprising:

(I) a latently crosslinked pressure-sensitive adhesive polymer containing pendent from recurring units in the polymer backbone active hydrogen groupings selected from the class consisting of —OH, —SH and >NH groupings and ethylenic groupings selected from the class consisting of a non-terminal ethylenic grouping conjugate with a hetero double bond and a terminal double bond not conjugate with a double bond in said recurring units, the major proportion of the recurring units of the polymer corresponding to monomers which by themselves can polymerize to tacky, adhesive polymers; and (II) an organic solvent in which said polymer is dissolved to provide a solution from which said polymer may be coated on a tape backing;

said polymer, during heating to evaporate solvent therefrom, being converted to a crosslinked polymer having a gel content greater than and a swelling index less than the polymer prior to solvent evaporation.

10. A process of manufacturing a pressure-sensitive adhesive tape from a pressure-sensitive adhesive polymer of monomers as defined in claim 1, comprising the steps of: (1) spreading a solution of said polymer in an organic solvent upon a backing surface to form a coating of said solution on the backing; and (2) heating said coating at a temperature of at least 65° C. to evaporate the solvent therefrom and convert the polymer to a crosslinked pressure-sensitive adhesive polymer having a gel content greater than and a swelling index less than the polymer prior to solvent evaporation.

11. A process of manufacturing a pressure-sensitive adhesive tape from a pressure-sensitive adhesive polymer of monomers as defined in claim 2, comprising the step of: (1) spreading a solution of said polymer in an organic solvent upon a backing surface to form a coating of said solution on the backing; and (2) heating said coating at a temperature of at least 65° C. to evaporate the solvent therefrom and convert the polymer to a crosslinked pressure-sensitive adhesive polymer having a gel content greater than and a swelling index less than the polymer prior to solvent evaporation.

12. A process of manufacturing a pressure-sensitive adhesive tape from a pressure-sensitive adhesive polymer of monomers as defined in claim 3, comprising the steps of: (1) spreading a solution of said polymer in an organic solvent upon a backing surface to form a coating of said solution on the backing; and (2) heating said coating at a temperature of at least 65° C. to evaporate the solvent therefrom and convert the polymer to a crosslinked pressure-sensitive adhesive polymer having a gel content greater than and a swelling index less than the polymer prior to solvent evaporation.

13. A process of manufacturing a pressure-sensitive adhesive tape from a pressure-sensitive adhesive polymer of monomers as defined in claim 4, comprising the steps of: (1) spreading a solution of said polymer in an organic solvent upon a backing surface to form a coating of said solution on the backing; and (2) heating said coating at a temperature of at least 65° C. to evaporate the solvent therefrom and convert the polymer to a crosslinked pressure-sensitive adhesive polymer having a gel content greater than and a swelling index less than the polymer prior to solvent evaporation.

14. A process of manufacturing a pressure-sensitive adhesive tape from a pressure-sensitive adhesive polymer of monomers as defined in claim 5, comprising the steps of: (1) spreading a solution of said polymer in an organic solvent upon a backing surface to form a coating of said solution on the backing; and (2) heating said coating at a temperature of at least 65° C. to evaporate the solvent therefrom and convert the polymer to a crosslinked pressure-sensitive adhesive polymer having a gel content greater than and a swelling index less than the polymer prior to solvent evaporation.

15. A process of manufacturing a pressure-sensitive adhesive tape from a pressure-sensitive adhesive polymer of monomers as defined in claim 6, comprising the steps of: (1) spreading a solution of said polymer in an organic solvent upon a backing surface to form a coating of said solution on the backing; and (2) heating said coating at a temperature of at least 65° C. to evaporate the solvent therefrom and convert the polymer to a crosslinked pressure-sensitive adhesive polymer having a gel content greater than and a swelling index less than the polymer prior to solvent evaporation.

16. A process of manufacturing a pressure-sensitive adhesive tape from a pressure-sensitive adhesive polymer of monomers as defined in claim 7, comprising the steps of: (1) spreading a solution of said polymer in an organic solvent upon a backing surface to form a coating of said solution on the backing; and (2) heating said coating at a temperature of at least 65° C. to evaporate the solvent therefrom and convert the polymer to a crosslinked pressure-sensitive adhesive polymer having a gel content greater than and a swelling index less than the polymer prior to solvent evaporation.

17. A process of manufacturing a pressure-sensitive adhesive tape from a pressure-sensitive adhesive polymer of monomers as defined in claim 8, comprising the steps of: (1) spreading a solution of said polymer in an organic solvent upon a backing surface to form a coating of said solution on the backing; and (2) heating said coating at a temperature of at least 65° C. to evaporate the solvent therefrom and convert the polymer to a crosslinked pressure-sensitive adhesive polymer having a gel content greater than and a swelling index less than the polymer prior to solvent evaporation.

18. A process of manufacturing a pressure-sensitive adhesive tape from a pressure-sensitive adhesive polymer as defined in claim 9, comprising the steps of: (1) spreading a solution of said polymer in an organic solvent upon a backing surface to form a coating of said solution on the backing; and (2) heating said coating at an elevated temperature to evaporate the solvent therefrom and convert the polymer to a crosslinked pressure-sensitive adhesive polymer having a gel content greater than and a swelling index less than the polymer prior to solvent evaporation.

19. A process of manufacturing a pressure-sensitive adhesive tape, comprising the steps of: (1) coating a tape backing with a polymer composition of claim 9 and (2) heating the coating at an elevated temperature to evaporate the solvent therefrom and convert the polymer to a crosslinked pressure-sensitive adhesive polymer having a gel content greater than and a swelling index less than the polymer prior to solvent evaporation.

References Cited

UNITED STATES PATENTS 3,299,010   1/1967   Samour _____ 260—78

WILLIAM H. SHORT, *Primary Examiner.*

H. D. ANDERSON, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,103 September 3, 1968

Carlos M. Samour et al.

It is certified that error appears in the above identified patent and that said Letters Patent are hereby corrected as shown below:

Column 15, line 18, "50" should read -- 15 --.

Signed and sealed this 3rd day of March 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents